US012578298B2

(12) United States Patent
Sumiyoshi et al.

(10) Patent No.: US 12,578,298 B2
(45) Date of Patent: Mar. 17, 2026

(54) CARBON MONOXIDE GAS SENSOR

(71) Applicants: MITSUI KINZOKU COMPANY, LIMTIED, Tokyo (JP); KYUSHU UNIVERSITY, NATIONAL UNIVERSITY CORPORATION, Fukuoka (JP)

(72) Inventors: Atsuro Sumiyoshi, Ageo (JP); Shingo Ide, Ageo (JP); Kengo Shimanoe, Fukuoka (JP); Ken Watanabe, Fukuoka (JP); Koichi Suematsu, Fukuoka (JP)

(73) Assignees: MITSUI KINZOKU COMPANY, LIMITED (JP); KYUSHU UNIVERSITY, NATIONAL UNIVERSITY CORPORATION (JP)

( * ) Notice: Subject to any disclaimer, the term of this patent is extended or adjusted under 35 U.S.C. 154(b) by 168 days.

(21) Appl. No.: 18/564,499

(22) PCT Filed: Jun. 20, 2022

(86) PCT No.: PCT/JP2022/024454
§ 371 (c)(1),
(2) Date: Nov. 27, 2023

(87) PCT Pub. No.: WO2022/270448
PCT Pub. Date: Dec. 29, 2022

(65) Prior Publication Data
US 2024/0255463 A1 Aug. 1, 2024

(30) Foreign Application Priority Data

Jun. 25, 2021 (JP) ................................. 2021-105411
Feb. 28, 2022 (JP) ................................. 2022-030443

(51) Int. Cl.
*G01N 27/407* (2006.01)

(52) U.S. Cl.
CPC ..... *G01N 27/4074* (2013.01); *G01N 27/4075* (2013.01)

(58) Field of Classification Search
CPC .......... G01N 27/4071; G01N 27/4074; G01N 27/4075; G01N 33/004
See application file for complete search history.

(56) References Cited

U.S. PATENT DOCUMENTS 5,879,525 A    3/1999  Kato
8,177,957 B2 *  5/2012  Martin ............... G01N 27/4175
                                                       205/781
(Continued)

FOREIGN PATENT DOCUMENTS

JP        2003-207482 A    7/2003
JP        2012-42222 A    3/2012
(Continued)

OTHER PUBLICATIONS

International Search Report of the International Searching Authority, issued in PCT/JP2022/024454, mailed Aug. 30, 2022; ISA/JP, 5 pages.
(Continued)

*Primary Examiner* — C. Sun
(74) *Attorney, Agent, or Firm* — Harness, Dickey & Pierce, P.L.C.

(57) ABSTRACT

A carbon monoxide gas sensor is a single-chamber sensor for measuring the carbon monoxide gas concentration in a gas phase. The carbon monoxide gas sensor has electrodes disposed on respective sides of a solid electrolyte layer. One of the electrodes is active for oxidation of carbon monoxide gas, and the other of the electrodes is more inactive for oxidation of carbon monoxide gas than the one electrode. The carbon monoxide gas sensor is configured to measure a short-circuit current between the electrodes. In the carbon (Continued)

monoxide gas sensor, the solid electrolyte layer has oxide ion conductivity.

8 Claims, 1 Drawing Sheet

(56) References Cited

U.S. PATENT DOCUMENTS

| | | | |
|---|---|---|---|
| 2012/0274337 A1 | 11/2012 | Nonaka et al. | |
| 2014/0042025 A1* | 2/2014 | Furuta | G01N 27/4076 |
| | | | 204/427 |
| 2016/0161444 A1* | 6/2016 | Shimizu | G01N 27/4074 |
| | | | 204/424 |
| 2018/0183068 A1* | 6/2018 | Ide | H01M 8/12 |
| 2020/0333284 A1* | 10/2020 | Beck | G01N 27/403 |

FOREIGN PATENT DOCUMENTS

| | | |
|---|---|---|
| JP | 2019-138764 A | 8/2019 |
| WO | 97/41428 A1 | 11/1997 |
| WO | 2015/002060 A1 | 1/2015 |
| WO | 2016/111110 A1 | 7/2016 |

OTHER PUBLICATIONS

Kento Mikata et al., "Detection characteristics of CO sensors that use oxide ion semiconductors c-La9. 66Si5. 3B0. 7026.14", Chemical Sensors, Mar. 15, 2022, vol. 38, Supplement A., pp. 10-12 (with English abstract), Note: only English abstract is considered.

* cited by examiner

CARBON MONOXIDE GAS SENSOR

CROSS REFERENCE TO RELATED APPLICATIONS

This application is a 371 U.S. National Phase of International Application No. PCT/JP2022/024454, filed on Jun. 20, 2022, which claims priority to Japanese Patent Application No. 2021-105411, filed Jun. 25, 2021 and which claims priority to Japanese Patent Application No. 2022-030443, filed Feb. 28, 2022. The entire disclosures of the above applications are incorporated herein by reference.

BACKGROUND

Technical Field

The present invention relates to a short-circuit current detection type carbon monoxide gas sensor.

Related Art

Controlled potential electrolysis gas sensors and semiconductor type gas sensors are known examples of sensors capable of measuring the carbon monoxide gas concentration in a gas phase. However, controlled potential electrolysis gas sensors have the disadvantage of having a short lifespan in a high-temperature environment due to the use of an electrolyte solution. Semiconductor type gas sensors have the disadvantage of being susceptible to a combustible gas other than carbon monoxide.

In addition to the above-described sensor types, JP 2003-207482A proposes a carbon monoxide gas sensor including a solid electrolyte made of a $BaCeO_3$-based oxide or a $CeO_2$-based oxide, which are ceramics exhibiting ion conductivity, and a pair of electrodes. This sensor is of a single-chamber type or a two-chamber type. This sensor is configured to measure the carbon monoxide gas concentration by measuring a short-circuit current value, an open-circuit potential difference, or a voltage value when a current is flowing between the electrodes.

JP 2012-42222A also proposes a carbon monoxide gas sensor in which a solid electrolyte is used. The solid electrolyte described in JP 2012-42222A is an oxide ion conductor referred to as LSGM8282. The sensor disclosed in JP 2012-42222A is configured to measure the carbon monoxide gas concentration by measuring a voltage value when a current is flowing between electrodes.

When using the two-chamber type sensor disclosed in JP 2003-207482A, an atmosphere to which a sensing electrode is exposed and an atmosphere to which a counter electrode is exposed need to be isolated from each other, which requires that the sensor be provided with an airtight structure, making the structure of the sensor more complex.

With the sensor disclosed in JP 2012-42222A, which is of the type that measures a voltage value when a current is flowing between the electrodes, a sufficient voltage value may not be obtained, and due to this, sufficient measurement accuracy may not be achieved.

Therefore, it is an object of the present invention to provide a carbon monoxide gas sensor that does not have a complex structure and that has high measurement accuracy.

SUMMARY

<1>
The present invention achieves the above-described object by providing a carbon monoxide gas sensor for measuring carbon monoxide gas concentration in a gas phase,
the sensor comprising a single-chamber sensor,
the sensor comprising:
an anion-conductive solid electrolyte layer; and
a first electrode disposed on a first side of the solid electrolyte layer and a
second electrode disposed on a second side of the solid electrolyte layer,
wherein the first electrode is active for oxidation of carbon monoxide gas,
the second electrode is more inactive for oxidation of carbon monoxide gas than the first electrode, and
the carbon monoxide gas sensor is configured to measure a short-circuit current between the electrodes.

<2>
Also, the present invention provides the carbon monoxide gas sensor as set forth in clause <1>, wherein the solid electrolyte layer has oxide ion conductivity.

<3>
The present invention provides the carbon monoxide gas sensor as set forth in clause <1> or <2>, wherein the solid electrolyte layer contains an oxide of a rare-earth element other than cerium.

<4>
The present invention provides the carbon monoxide gas sensor as set forth in any one of clauses <1> to <3>, wherein the solid electrolyte layer contains a compound having an apatite-type crystal structure.

<5>
The present invention provides the carbon monoxide gas sensor as set forth in any one of clauses <1> to <4>, wherein
the solid electrolyte layer contains a complex oxide represented by the formula (1): $A_{9.3+x}[T_{6.0-y} M_y]O_{26.0+z}$,
wherein A represents one or two or more elements selected from the group consisting of La, Ce, Y, Pr, Nd, Pm, Sm, Eu, Gd, Tb, Dy, Ho, Er, Yb, Lu, Be, Mg, Ca, Sr, and Ba;
T represents an element containing Si, Ge or both of Si and Ge;
M represents one or two or more elements selected from the group consisting of Mg, Al, Sc, Ti, V, Cr, Mn, Fe, Co, Ni, Ga, Y, Zr, Ta, Nb, B, Ge, Zn, Sn, W, and Mo;
x represents a number that is $-1.4$ or more and 1.5 or less;
y represents a number that is 0.0 or more and 3.0 or less; and
z represents a number that is $-5.0$ or more and 5.2 or less, and a ratio of a number of moles of A to a number of moles of T is 1.3 or more and 3.7 or less.

<6>
The present invention provides the carbon monoxide gas sensor as set forth in any one of clauses <1> to <5>, wherein a short-circuit current density of 0.01 $\mu A/cm^2$ or more in absolute value is detected at a temperature of 350° C. or more and 600° C. or less in an atmosphere containing 10 ppm or more of carbon monoxide gas.

<7>
The present invention provides the carbon monoxide gas sensor as set forth in any one of clauses <1> to <6>, wherein the electrode that is inactive for oxidation of carbon monoxide gas contains particles of gold alone or an alloy composed of a gold element.

<8>

The present invention provides the carbon monoxide gas sensor as set forth in any one of clauses <1> to <7>, wherein the electrode that is active for oxidation of carbon monoxide gas contains particles of a platinum group element alone or an alloy composed of a platinum group element.

DETAILED DESCRIPTION

Figure 1:
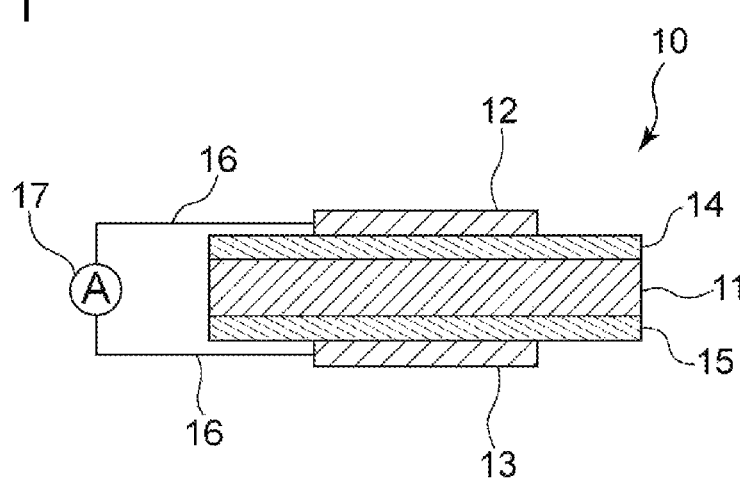
FIG. 1 schematically shows a cross section of an embodiment of a carbon monoxide gas sensor of the present invention taken along a thickness direction.

Hereinafter, the present invention will be described based on a preferred embodiment thereof, with reference to the drawings. FIG. 1 shows an embodiment of a carbon monoxide gas sensor of the present invention. A carbon monoxide gas sensor 10 shown in FIG. 1 includes a solid electrolyte layer 11 in the form of a layer. The carbon monoxide gas sensor 10 includes a sensing electrode 12 on one side of the solid electrolyte layer 11 and a counter electrode 13 on the other side of the solid electrolyte layer 11.

In the present embodiment, as shown in FIG. 1, a counter electrode-side intermediate layer 15 may be disposed between the counter electrode 13 and the solid electrolyte layer 11. Furthermore, a sensing electrode-side intermediate layer 14 may be disposed between the sensing electrode 12 and the solid electrolyte layer 11.

The carbon monoxide gas sensor 10 is configured to measure a short-circuit current between the sensing electrode 12 and the counter electrode 13. For this purpose, the sensing electrode 12 and the counter electrode 13 are connected to each other by a conductor 16. An ammeter 17 is disposed at an intermediate position of the conductor 16. The ammeter 17 is used to measure a current that flows when the sensing electrode 12 and the counter electrode 13 are short-circuited during measurement of the carbon monoxide gas concentration.

In the carbon monoxide gas sensor 10 of the embodiment shown in FIG. 1, the counter electrode-side intermediate layer 15 and the sensing electrode-side intermediate layer 14 are disposed directly on the respective sides of the solid electrolyte layer 11. In the present embodiment, no member is provided between the solid electrolyte layer 11 and the counter electrode-side intermediate layer 15 and between the solid electrolyte layer 11 and the sensing electrode-side intermediate layer 14. Also, in the present embodiment, no member is provided between the counter electrode 13 and the counter electrode-side intermediate layer 15 and between the sensing electrode 12 and the sensing electrode-side intermediate layer 14.

Although the counter electrode 13 and the counter electrode-side intermediate layer 15 have different sizes in the embodiment shown in FIG. 1, the relationship in size between the counter electrode 13 and the counter electrode-side intermediate layer 15 is not limited to this, and, for example, the counter electrode 13 and the counter electrode-side intermediate layer 15 may have the same size. The same holds true for the sensing electrode 12 and the sensing electrode-side intermediate layer 14, and the sensing electrode 12 and the sensing electrode-side intermediate layer 14 may have the same size, or, for example, the sensing electrode-side intermediate layer 14 may have a larger size than the sensing electrode 12.

Moreover, although the counter electrode-side intermediate layer 15 and the solid electrolyte layer 11 have the same size in the embodiment shown in FIG. 1, the relationship in size between the counter electrode-side intermediate layer 15 and the solid electrolyte layer 11 is not limited to this, and, for example, the solid electrolyte layer 11 and the counter electrode-side intermediate layer 15 may have different sizes. The same holds true for the sensing electrode 12 side.

The solid electrolyte layer 11 generally has a constant thickness, and contains an anion-conductive material. Typically, a material that has oxide ion conductivity is used for the solid electrolyte layer 11.

A single crystal material or a polycrystal material is used as the solid electrolyte constituting the solid electrolyte layer 11. In particular, it is preferable to use an oxide of a rare-earth element other than cerium as the material constituting the solid electrolyte layer 11, because this increases the oxide ion conductivity even further.

It is preferable to use an oxide of lanthanum as the oxide of a rare-earth element (other than cerium) contained in the solid electrolyte layer 11, because this increases the oxide ion conductivity yet even further. Examples of the oxide of lanthanum include a complex oxide containing lanthanum and gallium, a complex oxide obtained by adding strontium, magnesium, cobalt, or the like to the complex oxide containing lanthanum and gallium, a complex oxide containing lanthanum and molybdenum, and the like.

In particular, it is preferable to use an oxide ion conductor made of a complex oxide of lanthanum and silicon due to its high oxide ion conductivity.

An example of the complex oxide of lanthanum and silicon is an apatite-type complex oxide containing lanthanum and silicon. An apatite-type complex oxide that contains lanthanum, which is a trivalent element, silicon, which is a tetravalent element, and O and whose composition is represented by $La_xSi_6O_{1.5x+12}$, where x represents a number that is 8 or more and 10 or less, has high oxide ion conductivity and is therefore preferably used. In the case where this apatite-type complex oxide is used for the solid electrolyte layer 11, it is preferable that the c-axis of the apatite-type complex oxide matches the thickness direction of the solid electrolyte layer 11. The most preferable composition of this apatite-type complex oxide is $La_{9.33}Si_6O_{26}$. This complex oxide can be produced in accordance with a method disclosed in JP 2013-51101A, for example.

Another example of the material constituting the solid electrolyte layer 11 is a complex oxide represented by the formula (1): $A_{9.3+x}[T_{6.0-y}M_y]O_{26.0+z}$. This complex oxide has an apatite-type crystal structure as well. In the formula above, A represents one or two or more elements selected from the group consisting of La, Ce, Y, Pr, Nd, Pm, Sm, Eu, Gd, Tb, Dy, Ho, Er, Yb, Lu, Be, Mg, Ca, Sr, and Ba. In the formula above, T represents an element containing Si, Ge or both of Si and Ge. In the formula above, M represents one or two or more elements selected from the group consisting of Mg, Al, Sc, Ti, V, Cr, Mn, Fe, Co, Ni, Ga, Y, Zr, Ta, Nb, B, Ge, Zn, Sn, W, and Mo. From the viewpoint of achieving higher c-axis orientation, it is preferable that M is one or two or more elements selected from the group consisting of B, Ge, and Zn.

In the formula above, x preferably represents a number that is −1.4 or more and 1.5 or less, more preferably 0.0 or more and 0.7 or less, and even more preferably 0.4 or more and 0.6 or less, from the viewpoint of increasing the degree of orientation and the oxide ion conductivity.

In the formula above, y preferably represents a number that is 0.0 or more and 3.0 or less, more preferably 0.4 or more and 2.0 or less, and even more preferably 0.4 or more and 1.0 or less, from the viewpoint of filling the positions of the element T in the apatite-type crystal lattice.

In the formula above, z preferably represents a number that is −5.0 or more and 5.2 or less, more preferably −2.0 or more and 1.5 or less, and even more preferably −1.0 or more and 1.0 or less, from the viewpoint of keeping the electroneutrality within the apatite-type crystal lattice.

In the formula above, the ratio of the number of moles of A to the number of moles of T, or in other words, $(9.3+x)/(6.0-y)$ in the formula above is preferably 1.3 or more and 3.7 or less, more preferably 1.4 or more and 3.0 or less, and even more particularly preferably 1.5 or more and 2.0 or less, from the viewpoint of keeping the spatial occupation ratio in the apatite-type crystal lattice. Note that, in the formula (1), $A_{9.3+x}[T_{6.0-y}M_y]O_{26.0+z}$, if both T and M contain Ge, then $y=0$ in $(9.3+x)/(6.0-y)$ above.

Out of complex oxides represented by the formula above, it is preferable to use a complex oxide in which A is lanthanum, that is, a complex oxide represented by $La_{9.3+x}[T_{6.0-y}M_y]O_{26.0+z}$, because this increases the oxide ion conductivity even further. Specific examples of the composite oxide represented by $La_{9.3+x}[T_{6.0-y}M_y]O_{26.0+z}$ include $La_{9.3+x}(Si_{4.7}B_{1.3})O_{26.0+z}$, $La_{9.3+x}(Si_{4.7}Ge_{1.3})O_{26.0+z}$, $La_{9.3+x}(Si_{4.7}Zn_{1.3})O_{26.0+z}$, $La_{9.3+x}(Si_{4.7}W_{1.3})O_{26.0+z}$, $La_{9.3+x}(Si_{4.7}Sn_{1.3})O_{26.0+z}$, $La_{9.3+x}(Ge_{4.7}B_{1.3})O_{26.0+z}$, and the like. A complex oxide represented by the formula above can be produced in accordance with a method disclosed in WO 2016/111110, for example.

The thickness of the solid electrolyte layer 11 is preferably 10 nm or more and 1000 μm or less, more preferably 50 nm or more and 700 μm or less, and even more preferably 100 nm or more and 500 μm or less, from the viewpoint of effectively reducing the electric resistance of the carbon monoxide gas sensor 10. The thickness of the solid electrolyte layer 11 can be measured using, for example, a stylus profilometer or an electron microscope.

Next, the sensing electrode 12 and the counter electrode 13 will be described.

In the carbon monoxide gas sensor 10 of the present embodiment, the counter electrode 13 acts as a counter electrode of the sensing electrode 12, which will be described later. It is preferable that the counter electrode 13 is active for oxidation of carbon monoxide gas. The term "active for oxidation of carbon monoxide gas" means that, in the environment in which the carbon monoxide gas sensor 10 is used, the counter electrode 13 has catalytic activity that causes carbon monoxide gas to react with oxygen molecules on the electrode surface and thereby converts the carbon monoxide gas into carbon dioxide gas.

In view of this, the counter electrode 13 is preferably made of a platinum group element alone or an alloy composed of a platinum group element. These materials may be in the form of particles.

Examples of the platinum group element include platinum, ruthenium, rhodium, palladium, osmium, and iridium. The alloy composed of a platinum group element may be an alloy having a platinum group element content of 50 mol % or more and containing, for example, Pt—Pd, Pt—Rh, Pt—Ni, Pt—Au, Pt—W, or Pt—Cu as an alloy component.

When the platinum group element alone or the alloy composed of a platinum group element is in the form of particles, the particle size is preferably 0.01 μm or more and 100 μm or less in terms of the cumulative volume particle size $D_{50}$ at a cumulative volume of 50 vol % as measured using a laser diffraction scattering particle size distribution measurement method, from the viewpoint of ensuring that the particles have a sufficient surface area at the interface between the particles and the gas phase and from the viewpoint of suppressing deterioration caused by sintering of the particles during the production of the counter electrode.

On the other hand, in the carbon monoxide gas sensor 10 of the present embodiment, the sensing electrode 12 is an electrode that is exposed to an atmosphere to be measured and used to measure the concentration of carbon monoxide gas contained in the atmosphere to be measured. It is preferable that the sensing electrode 12 is more inactive for oxidation of carbon monoxide than the counter electrode 13. In particular, it is preferable that the sensing electrode 12 is inactive for oxidation of carbon monoxide. The term "inactive for oxidation of carbon monoxide" means that, in the environment in which the carbon monoxide gas sensor 10 is used, the sensing electrode 12 has lower catalytic activity to convert carbon monoxide gas into carbon dioxide gas on the electrode surface than the counter electrode 13.

In view of this, the sensing electrode 12 is preferably made of gold alone or an alloy composed of the gold element. These materials may be in the form of particles. The alloy composed of the gold element may be an alloy having a gold content of 50 mol % or more and containing, for example, Au—Ag, Au—Pt, Au—Pd, Au—In, Au—Sn, Au—Fe, or the like as an alloy component.

When gold alone or the alloy composed of the gold element is in the form of particles, the particle size is preferably 0.01 μm or more and 100 μm or less in terms of the cumulative volume particle size $D_{50}$, from the viewpoint of enabling efficient sensing of carbon monoxide, or in other words, from the viewpoint of ensuring that the particles have a sufficient surface area at the three-phase interface where the sensing electrode 12 is in contact with the solid electrolyte layer 11 or the sensing electrode-side intermediate layer 14.

It is preferable that the sensing electrode 12 and the counter electrode 13 each independently have a thickness of 10 nm or more and 1000 μm or less, and more preferably 50 nm or more and 700 μm or less, from the viewpoint of effectively reducing the electric resistance of the carbon monoxide gas sensor 10.

In the present invention, the counter electrode-side intermediate layer 15 may be disposed between the solid electrolyte layer 11 and the counter electrode 13 as in the embodiment shown in FIG. 1. Additionally, or alternatively, the sensing electrode-side intermediate layer 14 may be disposed between the solid electrolyte layer 11 and the sensing electrode 12. The counter electrode-side intermediate layer 15 and the sensing electrode-side intermediate layer 14 (hereinafter, these layers may be collectively referred to simply as "intermediate layers" for the sake of convenience) are not essential portions in the carbon monoxide gas sensor of the present invention, but the performance of the carbon monoxide gas sensor of the present invention is improved when the sensor includes the counter electrode-side intermediate layer 15 and/or the sensing electrode-side intermediate layer 14.

It is preferable that an intermediate layer is composed of a cerium oxide containing one or more rare-earth elements (hereinafter also referred to as "LnDC"). However, the term "rare-earth element" does not include cerium. In LnDC, a rare-earth element other than cerium is contained in cerium oxide ($CeO_2$) serving as a matrix, in a state of forming a solid solution in which the rare-earth element serves as the solute (dopant). The rare-earth element, which is the dopant element, usually occupies cerium sites in the cerium oxide crystal lattice as a result of replacing those sites.

In order to increase the oxide ion conductivity of the carbon monoxide gas sensor 10 even further, it is preferable that an intermediate layer is composed of a cerium oxide containing lanthanum and a rare-earth element (other than lanthanum and cerium) (hereinafter also referred to as "La-LnDC"). In La-LnDC, lanthanum may occupy cerium sites in the cerium oxide crystal lattice as a result of replacing those sites, or may be present at grain boundaries of crystal grains of a rare-earth-element-doped cerium oxide.

In order to increase the oxide ion conductivity of the carbon monoxide gas sensor 10 yet even further, it is preferable that an intermediate layer is composed of a cerium oxide containing lanthanum and any one or more elements selected from the group consisting of samarium, gadolinium, yttrium, erbium, ytterbium, and dysprosium.

In particular, it is preferable that an intermediate layer contains a cerium oxide containing lanthanum and either samarium or gadolinium, because this can increase the oxide ion conductivity of the entire carbon monoxide gas sensor 10 yet even further. Note that La-LnDC constituting the intermediate layer 14 and La-LnDC constituting the intermediate layer 15 may be the same or different. Moreover, a configuration may also be adopted in which one of the counter electrode-side intermediate layer 15 and the sensing electrode-side intermediate layer 14 contains La-LnDC, and the other intermediate layer is composed of another substance.

In La-LnDC, the proportion of the rare-earth element (other than lanthanum and cerium) with which the cerium oxide is doped, in terms of Ln/Ce, that is, the atomic ratio of the rare-earth element (Ln) to cerium, is preferably 0.05 at % or more and 0.5 at % or less, more preferably 0.1 at % or more and 0.4 at % or less, and even more preferably 0.2 at % or more and 0.3 at % or less. Setting the extent of doping with the rare-earth element to be within the above-described range makes it possible to improve the oxide ion conductivity between the solid electrolyte layer 11 and the sensing electrode 12 and/or the counter electrode 13.

Whether a solid solution of the rare-earth element in cerium oxide is formed is confirmed using X-ray diffractometry.

In La-LnDC that constitutes an intermediate layer, lanthanum is contained in order to improve the oxide ion conductivity of the carbon monoxide gas sensor 10. To this end, it is preferable that the value of La/Ce (at %), which is the atomic ratio of lanthanum to cerium, in La-LnDC is set to 0.3 or more. An excessively large amount of lanthanum will actually reduce the oxide ion conductivity, and therefore, it is preferable that the value of La/Ce (at %) is set to 1.2 or less. The value of La/Ce (at %) is more preferably set to 0.4 or more and 1.1 or less, and even more preferably 0.5 or more and 1.0 or less.

The total amount of rare-earth elements with which the cerium oxide constituting an intermediate layer is doped, or in other words, the sum total $Ln_T$ of the amount of lanthanum and the amount of the rare-earth element(s) other than lanthanum, in terms of the atomic ratio relative to cerium, that is, $Ln_T$/Ce (at %), is preferably 0.3 or more and 1.5 or less, from the viewpoint of improving the oxide ion conductivity of the carbon monoxide gas sensor 10. In order to make this advantage even more marked, the value of $Ln_T$/Ce (at %) is more preferably 0.4 or more and 1.4 or less, and even more preferably 0.5 or more and 1.3 or less. The method for measuring $Ln_T$/Ce (at %) will be described in detail in Examples below.

When an intermediate layer has a certain thickness or more, the oxide ion conductivity between the solid electrolyte layer 11 and the sensing electrode 12 and/or the counter electrode 13 can be effectively improved. The thickness of the intermediate layer on the sensing electrode 12 side and the thickness of the intermediate layer on the counter electrode 13 side are each independently preferably 1 nm or more and 1000 nm or less, and more preferably 10 nm or more and 700 nm or less. The thickness of an intermediate layer can be measured using a stylus profilometer or an electron microscope. The thickness of the counter electrode-side intermediate layer 15 and the thickness of the sensing electrode-side intermediate layer 14 may be the same or different.

The carbon monoxide gas sensor 10 of the embodiment shown in FIG. 1 can be suitably produced using a method described below, for example. First, a solid electrolyte layer 11 is produced using a known method. To produce the solid electrolyte layer 11, for example, the method disclosed in JP 2013-51101A or WO 2016/111110 can be used.

Next, a counter electrode-side intermediate layer 15 and a sensing electrode-side intermediate layer 14 are formed on two main surfaces of the solid electrolyte layer 11. To form the intermediate layers 14 and 15, for example, sputtering can be used. A target used in the sputtering can be produced using the following method, for example. That is to say, a powder of an oxide of a rare-earth element other than cerium and a cerium oxide powder are mixed using a mortar or an agitator such as a ball mill, and fired in an oxygen-containing atmosphere to obtain a raw material powder. This raw material powder is molded into the shape of the target to be obtained, and then sintered through hot pressing. The sintering conditions can be set as follows: temperature: 1000° C. or more and 1400° C. or less; pressure: 20 MPa or more and 35 MPa or less; and time: 60 minutes or longer and 180 minutes or shorter. The atmosphere can be an inert gas atmosphere, such as a nitrogen gas atmosphere or a rare gas atmosphere. The sputtering target obtained in this manner is composed of LnDC. Note that the method for producing the sputtering target is not limited to this production method, and, for example, a molded body having the shape of the target may be fired in an atmosphere of air or in an oxygen-containing atmosphere.

With use of the thus obtained target, sputtered layers are formed on the respective surfaces of the solid electrolyte layer 11 through high-frequency sputtering, for example. The temperature of the substrate may be increased to a temperature within a range of 300° C. to 500° C. in advance and be kept at this temperature during sputtering. The sputtered layers are preferably composed of LnDC.

Upon completion of the sputtering, the sputtered layers are annealed. The annealing is performed in order to diffuse lanthanum contained in the solid electrolyte layer 11 toward the sputtered layers by means of heat and thereby cause lanthanum to be contained in LnDC constituting the sputtered layers. To this end, the annealing conditions can be set as follows: temperature: 1300° C. or more and 1600° C. or less; and time: 10 minutes or longer and 120 minutes or shorter, or more preferably, temperature: 1400° C. or more and 1600° C. or less; and time: 10 minutes or longer and 90 minutes or shorter. The atmosphere can be an oxygen-containing atmosphere, such as an atmosphere of air. As other film-forming methods, for example, atomic layer deposition, ion plating, pulsed laser deposition, plating, chemical vapor deposition, and the like can be used.

Intermediate layers composed of lanthanum-containing LnDC (La-LnDC) are obtained through the above-described annealing. Then, a sensing electrode 12 and a counter electrode 13 are formed on the surface of the respective intermediate layers.

For the counter electrode 13, a paste containing particles of a platinum group element alone or an alloy composed of a platinum group element can be used. The paste is applied to the surface of the counter electrode-side intermediate layer 15 to form a coating film, the coating film is then fired, and thus, the counter electrode 13 made of a porous body is formed. The firing conditions can be set as follows: temperature: 600° C. or more and 900° C. or less; and time: 30 minutes or longer and 120 minutes or shorter. The atmosphere can be an oxygen-containing atmosphere, such as an atmosphere of air.

The formation of the sensing electrode 12 is similar to that of the counter electrode 13, and the sensing electrode 12 made of a porous body can be formed using a paste containing particles of gold alone or an alloy composed of gold.

Figure 2:
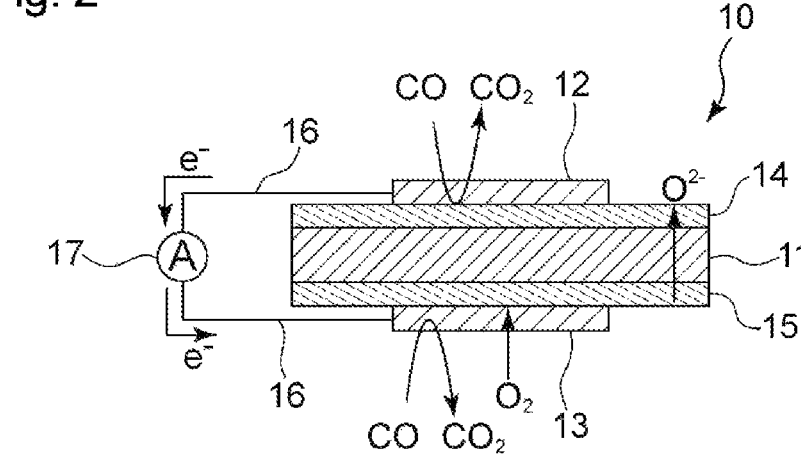
FIG. 2 is a schematic diagram illustrating the mechanism by which a short-circuit current is generated in the carbon monoxide gas sensor having the structure shown in FIG. 1.

The desired carbon monoxide gas sensor is obtained in the above-described manner. When the thus obtained carbon monoxide gas sensor of the present invention is placed in an atmosphere to be measured, and in this state, the counter electrode and the sensing electrode are short-circuited with a conductor, oxygen pumping occurs in response to the chemical potential difference between the two electrodes, thus generating a short-circuit current. If carbon monoxide gas, which is a combustible gas, is present in the atmosphere to be measured, carbon monoxide burns ($2CO+O_2 \rightarrow 2CO_2$) on the surface of the counter electrode 13, which is the electrode with higher oxidation activity, as shown in FIG. 2. On the other hand, in the sensing electrode 12, which is the electrode with lower oxidation activity, carbon monoxide is adsorbed onto the sensing electrode 12 and reaches all the way to the interface between the sensing electrode 12 and the solid electrolyte layer 11 (the interface between the sensing electrode 12 and the sensing electrode-side intermediate layer 14 when the sensing electrode-side intermediate layer 14 is present). As a result, a chemical potential difference is generated between the two electrodes 12 and 13, so that an oxygen reduction reaction ($O_2+4e^- \rightarrow 2O^{2-}$) occurs at the counter electrode 13, and an oxidation reaction of carbon monoxide gas ($CO+O^{2-} \rightarrow CO_2+2e^-$) occurs at the sensing electrode 12. Thus, a short-circuit current is generated between the two electrodes 12 and 13. By creating a calibration curve regarding the short-circuit current value and the concentration of carbon monoxide gas contained in an atmosphere to be measured in advance, it is possible to determine the concentration of carbon monoxide gas contained in any atmosphere to be measured from the measured value of the short-circuit current. Since the carbon monoxide gas sensor of the present invention has the counter electrode and the sensing electrode having the above-described configurations, in particular, having mutually different oxidation activities for carbon monoxide gas, the short-circuit current will have a high value, which makes it possible to measure the carbon monoxide gas concentration in a gas phase over a wide concentration range. Furthermore, even when the carbon monoxide gas concentration is low, accurate measurement is possible.

Since the carbon monoxide gas sensor of the present invention generates a short-circuit current by the above-described mechanism, the carbon monoxide gas sensor can be used as a single-chamber sensor. A single-chamber sensor refers to a sensor that is used in such a manner that both the counter electrode and the sensing electrode are exposed to the same atmosphere to be measured. When using a single-chamber sensor, there is no need to hermetically isolate the atmosphere on the counter electrode side and the atmosphere on the sensing electrode side from each other. Accordingly, a single-chamber sensor has the advantage of having a simple structure.

The carbon monoxide gas sensor of the present invention is preferably configured to detect a short-circuit current density of preferably 0.01 $\mu A/cm^2$ or more, and more preferably 0.02 $\mu A/cm^2$ or more, in absolute value, at a temperature of 350° C. or more and 600° C. or less in an atmosphere containing 10 ppm or more of carbon monoxide gas. There is no particular limitation on the upper limit value of the short-circuit current density, and the higher the short-circuit current density, the more accurately the concentration of carbon monoxide gas can be measured; however, the intended object of the present invention can be sufficiently achieved when the short-circuit current density is as high as about 0.1 $\mu A/cm^2$.

Note that, in the present invention, a current flowing from the sensing electrode 12 toward the counter electrode 13 is defined as a positive current.

The present invention has been described above based on a preferred embodiment thereof, but the present invention is not limited to the embodiment given above. For example, in the carbon monoxide gas sensor 10 of the embodiment shown in FIGS. 1 and 2, the counter electrode-side intermediate layer 15 is disposed between the counter electrode 13 and the solid electrolyte layer 11, and the sensing electrode-side intermediate layer 14 is disposed between the sensing electrode 12 and the solid electrolyte layer 11. Alternatively, however, a configuration may be adopted in which the counter electrode-side intermediate layer 15 and/or the sensing electrode-side intermediate layer 14 is not provided.

EXAMPLES

Hereinafter, the present invention will be described in greater detail using examples. However, the scope of the present invention is not limited to the examples given below.

Example 1

In the present example, a carbon monoxide gas sensor 10 having the structure shown in FIG. 1 was produced by performing steps (1) to (3) below.

(1) Production of Solid Electrolyte Layer 11

A $La_2O_3$ powder and a $SiO_2$ powder were blended in a mole ratio of 1:1. Then, ethanol was added thereto, followed by mixing using a ball mill. The mixture was dried, pulverized in a mortar, and fired at 1650° C. in an atmosphere of air for 3 hours using a platinum crucible. Ethanol was added to this fired product, and pulverization was performed using a planetary ball mill to obtain a fired powder. This fired powder was placed into a mold having a diameter of 20 mm and uniaxially molded by applying pressure from one direction. Furthermore, cold isostatic pressing (CIP) was performed at 600 MPa for 1 minute to thereby form a pellet. This pellet-shaped molded body was heated at 1600° C. in the air for 3 hours to obtain a pellet-shaped sintered body. This sintered body was subjected to an X-ray diffraction measurement and a chemical analysis, and was confirmed to have the structure of $La_2SiO_5$.

Then, 800 mg of the obtained pellet and 140 mg of a $B_2O_3$ powder were placed into a saggar with a lid, and heated, with use of an electric furnace, at 1550° C. (temperature of the atmosphere within the furnace) in the air for 50 hours. Due to this heating, $B_2O_3$ vapor was generated in the saggar, and the $B_2O_3$ vapor was reacted with the pellet. Thus, a solid electrolyte layer 11 to be produced was obtained. This solid electrolyte layer 11 was made of a compound represented by $La_{9.3+x}[Si_{6.0-y}B_y]O_{26.0+z}$, where x=0.50, y=1.17, and z=0.16 and the mole ratio between La and B was 8.38 (hereinafter this compound will be abbreviated as "LSBO"). The oxide ion conductivity of LSBO at 500° C. was $3.0 \times 10^{-2}$ S/cm. The thickness of the solid electrolyte layer 11 was 350 μm.

(2) Production of Counter Electrode-Side Intermediate Layer 15 and Sensing Electrode-Side Intermediate Layer 14

A $Sm_{0.2}Ce_{1.8}O_2$ powder was placed into a mold having a diameter of 50 mm, uniaxially molded by applying pressure from one direction, and subsequently sintered through hot pressing. Regarding the sintering conditions, the sintering was performed in a nitrogen gas atmosphere at a pressure of 30 MPa and a temperature of 1200° C. for 3 hours. In this manner, a sputtering target was obtained. With the obtained target, sputtering was performed onto each side of the solid electrolyte layer 11 using a high-frequency sputtering method, and thus, sputtered layers of a samarium-doped cerium oxide (hereinafter also referred to as "SDC") were formed. The sputtering was performed under the conditions of an RF output of 30 W and an argon gas pressure of 0.8 Pa.

Upon completion of the sputtering, annealing was performed at 1500° C. in the air for 1 hour to thermally diffuse lanthanum contained in LSBO toward the sputtered layers and thereby cause lanthanum to be contained in SDC. In this manner, a counter electrode-side intermediate layer 15 and a sensing electrode-side intermediate layer 14 made of lanthanum-containing SDC (hereinafter also referred to as "La-SDC") were formed. Both of the intermediate layers 14 and 15 had a thickness of 300 nm. As a result of a quantitative analysis using energy-dispersive X-ray spectroscopy (EDS), an atomic ratio (at %) of La/Ce in the counter electrode-side intermediate layer 15 and the sensing electrode-side intermediate layer 14 was 0.98.

(3) Production of Sensing Electrode 12 and Counter Electrode 13

A paste containing a platinum powder was applied to the surface of the counter electrode-side intermediate layer 15 to form a coating film. The coating film was dried at 120° C. in the air for 3 hours and then fired at 750° C. for 1 hour, to obtain a counter electrode 13 made of a porous body. The thickness of the counter electrode 13 was 10.0 μm.

A paste containing a gold powder was applied to the surface of the sensing electrode-side intermediate layer 14 to form a coating film. The coating film was dried at 120° C. in the air for 3 hours and then fired at 750° C. for 1 hour, to obtain a sensing electrode 12 made of a porous body. The thickness of the sensing electrode 12 was 10.0 μm.

Example 2

A carbon monoxide gas sensor 10 was obtained in the same manner as in Example 1, except that the firing temperature and the firing time for the sensing electrode 12 were changed as shown in Table 1.

Example 3

In the present example, a carbon monoxide gas sensor 10 was produced by performing steps (1) and (2) below. This sensor had a three-layer structure without the counter electrode-side intermediate layer 15 and the sensing electrode-side intermediate layer 14.

(1) Production of Solid Electrolyte Layer 11

A solid electrolyte layer 11 was produced in the same manner as in Example 1.

(2) Production of Sensing Electrode 12 and Counter Electrode 13

A paste containing a platinum powder was applied to one side of the solid electrolyte layer 11 to form a coating film. The coating film was dried at 120° C. in the air for 3 hours and then fired at 850° C. for 1 hour, to obtain a counter electrode made of a porous body. The thickness of the counter electrode was 5.0 μm.

A paste containing a gold powder was applied to another side of the solid electrolyte layer 11 to form a coating film. The coating film was dried at 120° C. in the air for 3 hours and then fired at 850° C. for 1 hour, to obtain a sensing electrode made of a porous body. The thickness of the sensing electrode was 5.0 μm.

Evaluation 1

The carbon monoxide gas sensors 10 obtained in Examples 1 to 3 were placed in atmospheres to be measured ($N_2$ atmospheres containing CO and $O_2$) in which the oxygen concentrations and the carbon monoxide gas concentrations were as shown in Table 2, and the short-circuit current density was measured. The temperatures of the atmospheres to be measured were as shown in Table 2. Table 2 shows the measurement results.

TABLE 1

| | Solid electrolyte layer | Sensing electrode | | | Reference electrode | | | Sensing electrode-side intermediate layer and reference electrode-side intermediate layer |
| | | Material | Firing temperature (° C.) | Firing time (hr) | Material | Firing temperature (° C.) | Firing time (hr) | Material |
|---|---|---|---|---|---|---|---|---|
| Ex. 1 | LSBO | Au | 750 | 1 | Pt | 750 | 1 | La-SDC |
| Ex. 2 | LSBO | Au | 850 | 7 | Pt | 750 | 1 | La-SDC |
| Ex. 3 | LSBO | Au | 850 | 7 | Pt | 750 | 1 | — |

TABLE 2

| | Atmosphere to be measured | | |
| Temperature (° C.) | $O_2$ concentration (vol %) | CO concentration (ppm) | Short-circuit current density ($\mu A/cm^2$) |
| --- | --- | --- | --- |
| Ex. 1 | 600 | 10.0 | 400 | −5.5 |
| | 450 | 10.0 | 400 | −1.2 |
| Ex. 2 | 600 | 12.6 | 400 | −5.0 |
| | | | 300 | −3.6 |
| | | | 200 | −2.1 |
| | | | 100 | −0.9 |
| | 550 | 12.6 | 400 | −6.0 |
| | 500 | 12.6 | 400 | −4.0 |
| | 450 | 12.6 | 400 | −2.0 |
| | | | 300 | −1.6 |
| | | | 200 | −1.1 |
| | | | 100 | −0.7 |
| Ex. 3 | 600 | 12.6 | 400 | −0.8 |

As can be clearly seen from the results shown in Table 2, high short-circuit current densities were obtained with the carbon monoxide gas sensors 10 of the examples.

Figure 3:
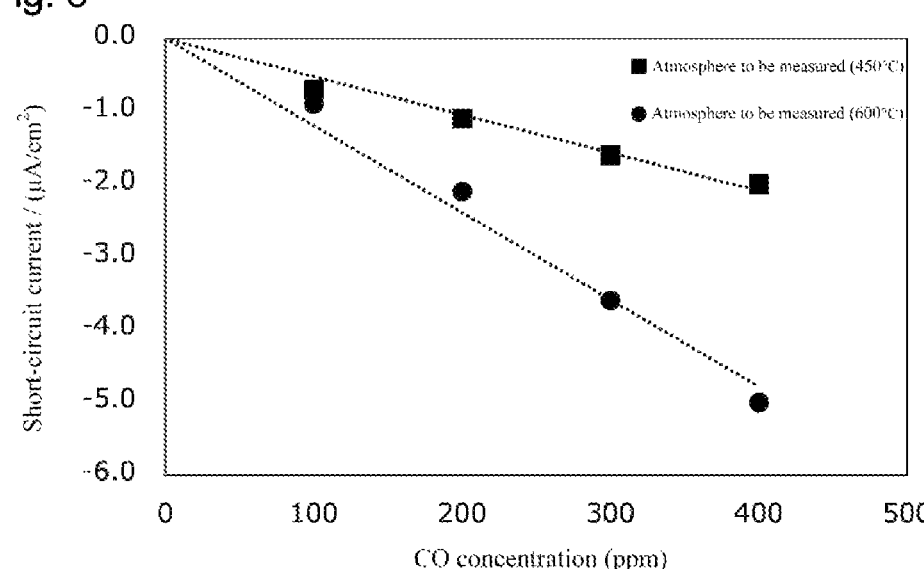
FIG. 3 is a graph showing results of short-circuit current measurement that was performed using a carbon monoxide gas sensor produced in Example 2.

FIG. 3 shows the relationship between the CO concentration in each atmosphere to be measured and the short-circuit current density, with respect to the carbon monoxide gas sensor 10 produced in Example 2. As can be clearly seen from the results shown in FIG. 3, the short-circuit current density value changed linearly with changes in the CO concentration. Therefore, it was confirmed that the carbon monoxide gas sensor of the present invention, which uses the difference in CO oxidation activity between the counter electrode and the sensing electrode, is useful as a single-chamber, short-circuit current type sensor.

INDUSTRIAL APPLICABILITY

As described in detail above, according to the present invention, a carbon monoxide gas sensor that does not have a complex structure and that has high measurement accuracy is provided.

The invention claimed is:

1. A carbon monoxide gas sensor for measuring carbon monoxide gas concentration in a gas phase, the sensor comprising a single chamber sensor, the sensor comprising:
    an anion-conductive solid electrolyte layer; and
    a first electrode disposed on a first side of the solid electrolyte layer and a second electrode disposed on a second side of the solid electrolyte layer,
    wherein the first electrode is active for oxidation of carbon monoxide gas, the second electrode has a catalytic activity for oxidation of carbon monoxide gas that is less than that of the first electrode, and the carbon monoxide gas sensor is configured to measure a short-circuit current between the first electrode and the second electrode.

2. The carbon monoxide gas sensor according to claim 1, wherein the solid electrolyte layer has oxide ion conductivity.

3. The carbon monoxide gas sensor according to claim 1, wherein the solid electrolyte layer contains an oxide of a rare-earth element other than cerium.

4. The carbon monoxide gas sensor according to claim 1, wherein the solid electrolyte layer contains a compound having an apatite-type crystal structure.

5. The carbon monoxide gas sensor according to claim 1, wherein
    the solid electrolyte layer contains a complex oxide represented by the formula (1): $A_{9.3+x}[T_{6.0-y}M_y]O_{26.0+z}$, wherein A represents one or two or more elements selected from the group consisting of La, Ce, Y, Pr, Nd, Pm, Sm, Eu, Gd, Tb, Dy, Ho, Er, Yb, Lu, Be, Mg, Ca, Sr, and Ba;
    T represents an element containing Si, Ge or both of Si and Ge;
    M represents one or two or more elements selected from the group consisting of Mg, Al, Sc, Ti, V, Cr, Mn, Fe, Co, Ni, Ga, Y, Zr, Ta, Nb, B, Ge, Zn, Sn, W, and Mo;
    x represents a number that is −1.4 or more and 1.5 or less;
    y represents a number that is 0.0 or more and 3.0 or less; and
    z represents a number that is −5.0 or more and 5.2 or less,
    and a ratio of a number of moles of A to a number of moles of T is 1.3 or more and 3.7 or less.

6. The carbon monoxide gas sensor according to claim 1, wherein a short-circuit current density of 0.01 $\mu A/cm^2$ or more in absolute value is detected at a temperature of 350° C. or more and 600° C. or less in an atmosphere containing 10 ppm or more of carbon monoxide gas.

7. The carbon monoxide gas sensor according to claim 1, wherein the second electrode that has the catalytic activity for oxidation of carbon monoxide gas that is less than that of the first electrode contains particles of gold alone or an alloy composed of a gold element.

8. The carbon monoxide gas sensor according to claim 1, wherein the first electrode that is active for oxidation of carbon monoxide gas contains particles of a platinum group element alone or an alloy composed of a platinum group element.

* * * * *